Oct. 21, 1930. E. E. MASTON Re. 17,843

DEVICE FOR HOLDING ROLLS OF PAPER

Original Filed July 5, 1924 2 Sheets-Sheet 1

Inventor
Edward E. Maston
By E. A. Wagonseller Atty.

Oct. 21, 1930. E. E. MASTON Re. 17,843

DEVICE FOR HOLDING ROLLS OF PAPER

Original Filed July 5, 1924 2 Sheets-Sheet 2

Inventor
Edward E. Maston
By E. A. Wagonseller. Atty.

Reissued Oct. 21, 1930 Re. 17,843

UNITED STATES PATENT OFFICE

EDWARD E. MASTON, OF WILMETTE, ILLINOIS, ASSIGNOR TO MID-WEST BOX COMPANY, OF CHICAGO, ILLINOIS, A CORPORATION OF INDIANA

DEVICE FOR HOLDING ROLLS OF PAPER

Original No. 1,659,276, dated February 14, 1928, Serial No. 724,205, filed July 5, 1924. Application for reissue filed February 14, 1930. Serial No. 428,525.

The invention relates to devices for holding rolls of paper and the like.

In the operation of machines to which a strip of paper is fed from a large supply roll, such as a machine for making faced corrugated board, a desideratum has been to avoid the stoppage of the machine or lack of supply incident to the removal of the empty spools and placement of full rolls in feeding position. The primary object of the present invention is to provide a device by which a full roll may be placed in its operative position, before the roll from which the machine is being supplied has been run off, and in readiness to be threaded into the machine without interrupting the supply.

In general, this device embodies means for temporarily supporting a full roll in one position in readiness to be fed to the machine without interruption of the supply, and means for transferring the full roll to the normal position of the supply roll while it is being run off and after the empty spool has been removed. Another object of the invention is to provide a device of this character by which the paper will be constantly kept under the desired tension to prevent overrunning.

The invention consists in the several novel features hereinafter set forth and more particularly defined by the claims at the conclusion hereof.

Figure 1:
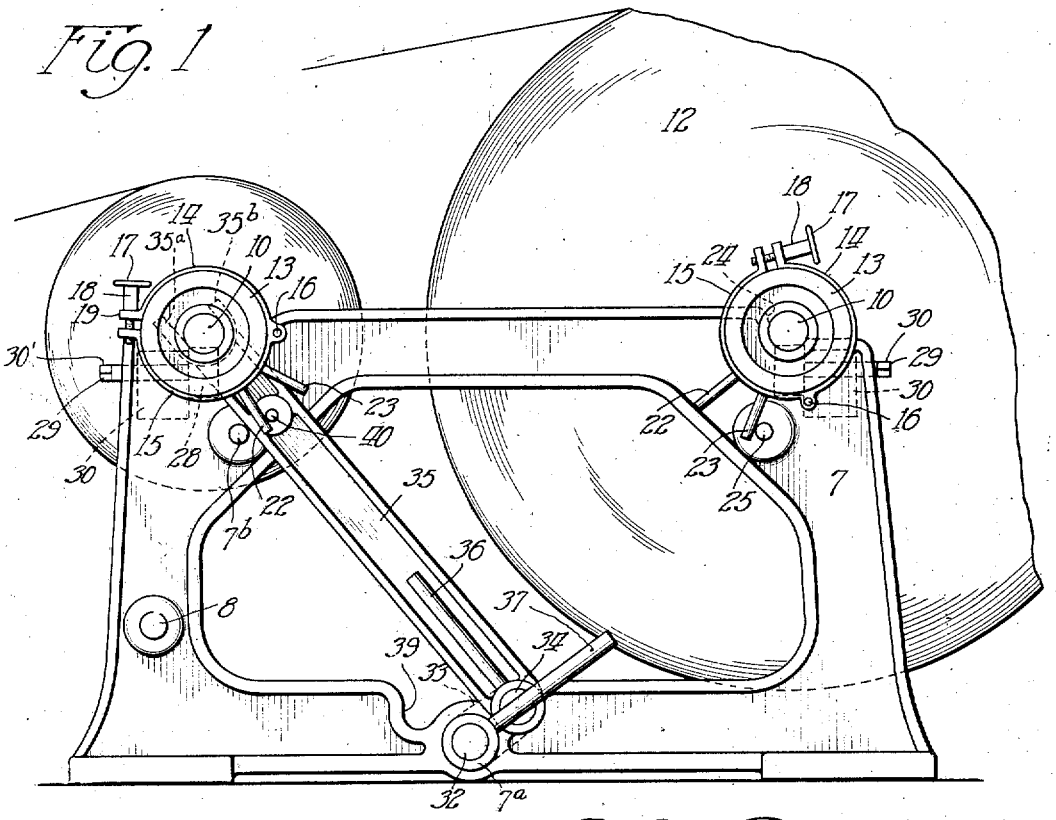
Figure 2:
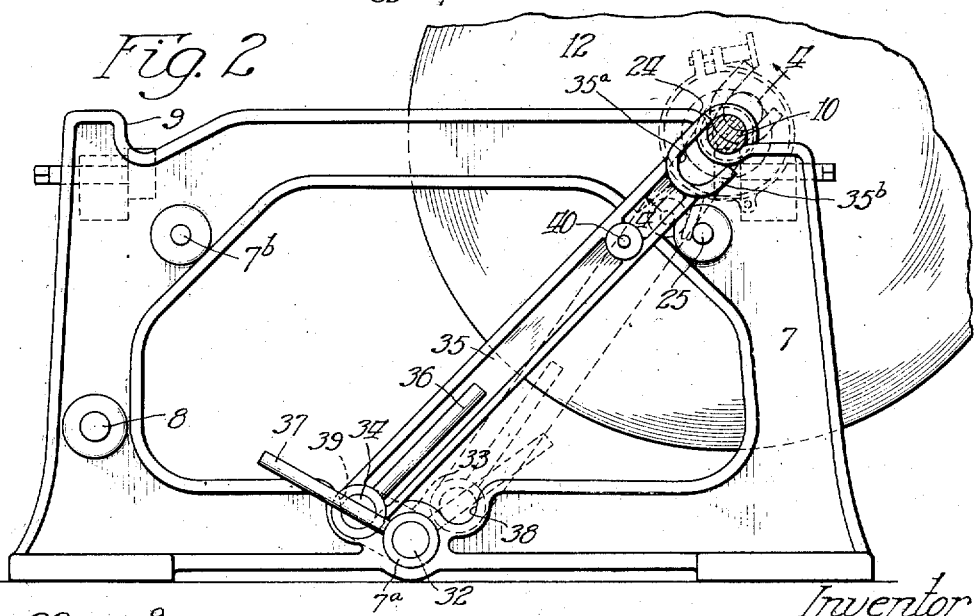
Figure 2A:
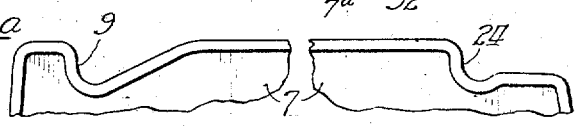
Figure 3:
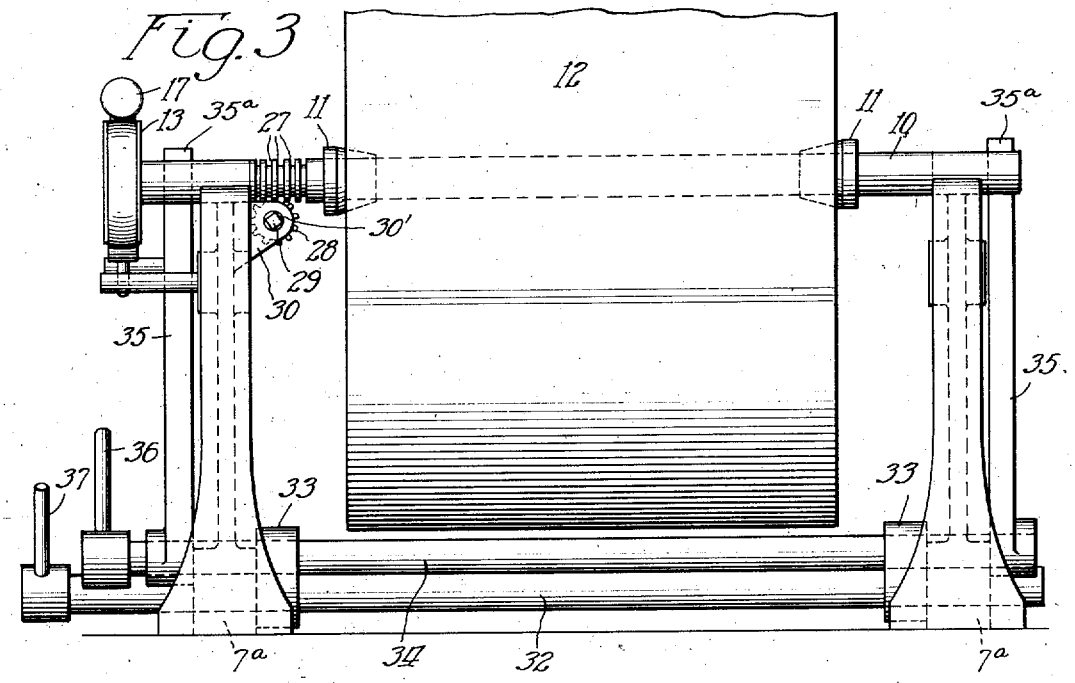
Figure 4:
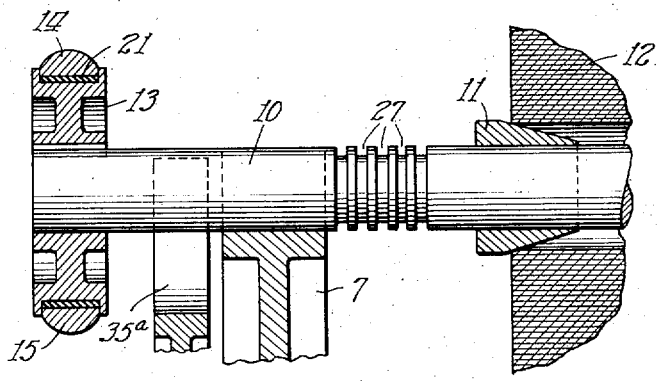
Figure 5:
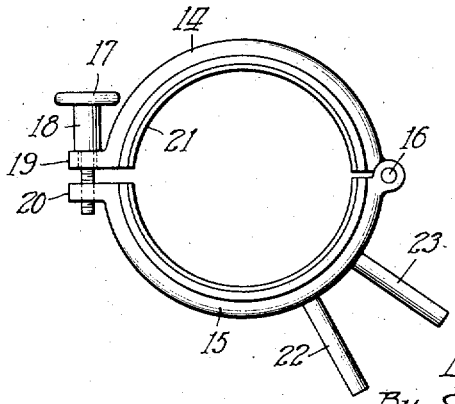

In the drawings: Fig. 1 is a side elevation of a structure embodying the invention, showing a full roll in its temporary position in readiness to be supplied to the machine while the roll from which the paper is being run, is nearly empty. Fig. 2 is a similar view showing the transfer mechanism in position to transfer the full roll to the normal operative position of the supply roll. Fig. 2[a] is a detail of the pocket-bearings in the supporting frame. Fig. 3 is a front elevation. Fig. 4 is a section taken on line 4—4 of Fig. 2. Fig. 5 is a detail of the braking or retarding device.

The invention is exemplified in a structure comprising a supporting frame composed of similar sides 7 which are rigidly cross-connected by a rod 8, and are adapted to rest upon the floor.

Adjacent their rear ends the frame sides 7 are provided with aligned recesses which form open or pocket-bearings 9 for a shaft 10, which is usually provided with cones 11 to form a spool or reel on which the paper 12 is wound, is adapted to rest and run in, and to be lowered into and be raised out of said bearings. The shaft 10 of each roll of paper is supported and held in bearings 9 while the roll is being unwound by the feed-rolls of the machine to be supplied with paper. Each shaft 10 is provided adjacent one end, with a grooved pulley 13 for a friction or braking device which sufficiently retards the rotation of the shaft to prevent the roll from overrunning or to apply the desired resistance to the paper according to the requirements of the machine supplied. Each braking device consists of a ring fitting in the pulley 13 and formed of sections 14 and 15 which are hinged together, as at 16. A screw 17 is provided with a shoulder 18 engaging a perforated lug 19 on ring-section 14 and is threaded to a lug 20 on ring-section 15 to hold the ring-sections on the pulley 13. Suitable brake lining 21 is secured to the inner periphery of the ring-sections. By adjusting the screw 17 the friction of the ring on the pulley may be regulated to put the desired tension on the paper. A pair of arms 22 and 23 project from ring-section 15 of the brake-ring and are adapted to engage co-acting stop-pins as hereinafter set forth.

The supporting frame is also provided adjacent its front end with aligned recesses 24 which form open or pocket-bearings for the shaft 10 of a second paper roll. These front-bearings are positioned to hold a full roll before the supply roll held in bearings 9 has been run off. The stop-arm 23 on the braking device of a shaft held in bearings 24 will engage a stop-pin 25 projecting from one of the frame-sides 7 so that while the roll is being thus supported the desired friction will be applied to the paper to prevent it from overrunning or to put the desired tension thereon according to the requirements of the machine to which the paper is supplied. The supplemental bearings 24 make it possible to have a full roll in readiness to be threaded into the machine as soon as the roll carried in bearings 9 is empty and consequently there will be available an uninterrupted supply of paper. Each shaft 10 is provided with a series of annular grooves 27 which when the shaft is placed in bearings 24, receive the teeth of a pinion 28 which is mounted on a shaft 29 carried in a bearing 30 on one of the frame-sides. This shaft 28 has a polygonal end 30′ so that it may be turned by an ordinary wrench to transversely adjust the shaft 10 to bring the roll into correct transverse alignment with the machine. A similar device is provided to adjust the shaft 10 of a roll of paper supported in the bearings 9.

Mechanism is provided to transfer a roll from bearings 24 to bearings 9, after the roll carried by the latter is empty and its shaft 10 has been removed. This mechanism comprises a transverse rockable shaft 32 which passes through bearings $7^a$ in the frame-sides 7 and a pair of lifting arms 33 which are rigidly attached to said shaft. A tiltable transfer-device which is adapted to transfer a shaft 10 with a roll thereon from bearings 24 to bearings 9 while the roll is being run off into the machine, comprises a shaft 34 which is pivotally mounted in the distal ends of lifting arms 33 and a pair of transfer arms 35 fixed to shaft 34. The upper end of each arm 35 is forked as at $35^a$ to straddle and hold a shaft 10 during a transferring operation. An operating arm 36 fixed to shaft 34 is adapted to slip into and be shifted by a long piece of pipe serving as a lever. An operating arm 37 is rigidly fixed to shaft 32 and is also adapted to pass into and be shifted by a long piece of pipe or lever. The frame-sides 7 are provided with aligned open bearings or recesses 38 and 39 which are adapted to support the shaft 34 in two alternative positions. The forward swing of the arms 35 is limited by a stop-pin $7^b$ so that in transferring a roll to bearing 9 the transfer arms will be arrested in correct position to deposit the roll-shaft 10 in bearings 9.

A stop pin 40 is provided on one of the arms 35, which when the arm is lifted to transfer a roll-shaft 10 in bearings 24, will pass into position to engage arm 22 of the braking device to prevent the roll from unwinding while its shaft is being sustained and transferred by the transfer arms 35 to bearings 9.

The operation will be as follows:

A shaft 10 with a full roll of paper thereon will be placed into pockets 24. The brake-arm 23 on the brake-ring carried by said shaft will engage the stop-pin 25 on the one of the frame-sides 7, while the shaft remains in pocket 24, so that the paper will be kept under proper or necessary tension to supply the machine. The paper may be connected to supply the machine as soon as this roll is held in pockets 24. While the paper from this roll is being drawn into the machine, its shaft 10 will be transferred to pockets 9 without interruption in the paper supply. This transfer is effected by first rocking shaft 34 into the position shown by full lines in Fig. 2, by means of a lever applied to arm 36. Then arm 37 of the lifting device will be operated to position shown by dotted lines from the position shown by full lines. This will lift shaft 10 sufficiently to clear pockets 24 and bring stop-pin 40 into active relation with brake-arm 22 to keep the paper under tension during its transfer. A lever will then be applied to arm 36 to swing the transfer arms 35 together with shaft 10 and its roll into position shown in full lines of Fig. 1 and so that the shaft will rest and be rotatable in pockets 9. The front ends of said pockets are inclined to permit the shaft 10 to be swung into said pockets by arms 35. One side $35^b$ of each fc k $35^a$ is cut away to permit the fork to pass under a shaft 10 in pockets 24, the other side being adapted to be arrested by the shaft. This transfer is accomplished without interrupting the paper supply. The transferred roll will be completely run off while its shaft remains in pockets 9 and arms 35 remain connected thereto. Before this roll is exhausted, a full roll will be placed in pockets 24 in readiness to be connected to the machine the instant or before the supply from the roll in pockets 9 becomes exhausted. Next the empty shaft 10 will be removed from pockets 9 and the roll will be transferred from pockets 24 as before described.

The invention exemplifies a mechanism for handling rolls of paper whereby a full roll may be successively placed in readiness to supply a machine and then transferred into position to be run off; and in which provision is made for braking the rolls at all times and during the transfer thereof.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In mechanism for handling rolls of paper and the like, the combination of a supporting structure provided with open bearings for simultaneously supporting two shafts one in front of the other, a pair of transfer arms pivoted to swing between the bearings and having means at their upper ends to support a shaft, and means for operating the arms to lift a shaft out of one of the bearings so that the arms may be swung to transfer the shaft to the other bearing.

2. In mechanism for handling rolls of paper and the like, the combination of a supporting structure provided with open bearings for simultaneously supporting two shafts one in front of the other, a pair of transfer arms pivoted to swing between the bearings and having means at their upper ends to support a shaft, means for shifting the arms to lift a shaft out of one of the bearings, and means for swinging said arms to transfer the lifted shaft to the other bearing.

3. In mechanism for handling rolls of paper and the like, the combination of a supporting structure provided with open bearings for simultaneously supporting two shafts one in front of the other, a pair of transfer arms pivoted to swing between the bearings and having means at their upper ends to support a shaft, means for shifting the transfer arms to lift a shaft out of one of the bearings comprising a rock shaft and a pair of arms, and means for swinging the transfer arms to transfer the lifted shaft to the other bearing.

4. In mechanism for handling rolls of paper and the like, the combination of a supporting structure provided with open bearings for simultaneously supporting two shafts one in front of the other, a rock shaft, a pair of transfer arms connected at their lower ends to the rock shaft and provided at their upper ends with means to support a shaft, means for shifting the rock shaft and transfer arms to lift a shaft out of one of the bearings, and means for swinging the transfer arms to transfer the lifted shaft to the other bearing.

5. In mechanism for handling rolls of paper and the like, the combination of a supporting structure provided with fixed open bearings for simultaneously supporting two shafts transversely grooved, one in front of the other, a pinion mounted on the structure and adapted to engage the grooved portion of one of the shafts, said pinion being operable to shift said one shaft axially relatively to the other, and means for transferring one of the shafts from one bearing to the other.

6. In mechanism for handling rolls of paper and the like, the combination of a supporting structure provided with bearings for simultaneously supporting two shafts, one in front of the other, a brake pulley mounted respectively on each of said shafts to rotate therewith, a braking device for each of said brake pulleys and adapted to cooperate therewith to retard rotation of its shaft, said braking device being constructed independently of the supporting structure, means for effecting the transfer of a shaft from one of the bearings to the other, and means cooperating with said braking device during the transferring operation for preventing rotation of said braking device with said brake pulley whereby a substantially constant retarding effect will be maintained upon the shaft being transferred.

7. In mechanism for handling rolls of paper and the like, the combination of a supporting structure provided with bearings adapted to simultaneously support two shafts, one in front of the other, a brake pulley mounted to rotate with one of said shafts, a braking device for said brake pulley and adapted to cooperate therewith to retard rotation of the shaft, said braking device comprising an adjustable, unitary brake band constructed independently of the supporting structure, means for effecting the transfer of a shaft from one of the bearings to the other, and means cooperating with said braking device during the transferring operation for preventing rotation of said braking device with said brake pulley.

8. In mechanism for handling rolls of paper and the like, the combination of a supporting structure provided with spaced bearings adapted to successively support a shaft, a brake pulley mounted to rotate with said shaft, a braking device for said brake pulley adapted to cooperate therewith to retard rotation of the shaft, said braking device comprising an adjustable, unitary brake band constructed so as to be separable from the supporting structure, means for effecting the transfer of the shaft from one of the bearings to the other, and means cooperating with said brake band during the transferring operation for preventing rotation thereof with said brake pulley whereby a substantially constant tension is maintained on said brake pulley to retard the rotation of said shaft.

9. In mechanism for handling rolls of paper and the like, the combination of a supporting structure provided with spaced bearings adapted to successively support a shaft in each of two positions, a brake pulley mounted to rotate with said shaft, a braking device for said brake pulley adapted to cooperate therewith to retard rotation of the shaft, said braking device comprising a unitary brake band constructed so as to be separable from the supporting structure, mechanism including a pair of levers for effecting the transfer of the shaft from one of the bearings to the other, and means cooperating with said brake band during the transferring operation for preventing rotation thereof with said brake pulley whereby tension is at all times maintained on said brake pulley to retard the rotation of said shaft.

10. In mechanism for handling rolls of paper and the like, the combination of a supporting structure provided with means for simultaneously supporting two rolls in position to supply a machine, a device for successively transferring the rolls from one position to the other, and means for braking the rolls while they are being transferred, said means comprising a brake pulley for each of said rolls and mounted to rotate therewith, a braking device independent of and separable f or said supporting structure and adapted to cooperate with said brake pulley for preventing free rotation thereof, and cooperating mechanism associated with said transfer device, said supporting structure and said brake pulley for maintaining said braking device in operative braking condition during the transferring operation.

Signed at Chicago, Illinois, this 11th day of February, 1930.

EDWARD E. MASTON.

CERTIFICATE OF CORRECTION.

Reissue Patent No. 17,843. Granted October 21, 1930, to

EDWARD E. MASTON.

It is hereby certified that the above numbered patent was erroneously issued to "Mid-West Box Company, of Chicago, Illinois, a corporation of Indiana", whereas said patent should have been issued to Mid-West Box Company, of Chicago, Illinois, a corporation of Delaware, said corporation being assignee by mesne assignments of the entire interest in said invention, as shown by the records of assignments in this office; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.

said supporting structure and adapted to cooperate with said brake pulley for preventing free rotation thereof, and cooperating mechanism associated with said transfer device, said supporting structure and said brake pulley for maintaining said braking device in operative braking condition during the transferring operation.

Signed at Chicago, Illinois, this 11th day of February, 1930.

EDWARD E. MASTON.

CERTIFICATE OF CORRECTION.

Reissue Patent No. 17,843. Granted October 21, 1930, to

EDWARD E. MASTON.

It is hereby certified that the above numbered patent was erroneously issued to "Mid-West Box Company, of Chicago, Illinois, a corporation of Indiana", whereas said patent should have been issued to Mid-West Box Company, of Chicago, Illinois, a corporation of Delaware, said corporation being assignee by mesne assignments of the entire interest in said invention, as shown by the records of assignments in this office; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.